United States Patent Office 3,407,443
Patented Oct. 29, 1968

3,407,443
INJECTION MOLDING APPARATUS
Brian H. Beebee, Malvern, Johannesburg, Transvaal, Republic of South Africa, and Edward G. Bullivant, Sutton Coldfield, England, assignors to Dunlop Rubber Company Limited, London, England, a British company
Filed Aug. 4, 1965, Ser. No. 477,156
Claims priority, application Great Britain, Aug. 8, 1964, 32,380/64
8 Claims. (Cl. 18—30)

ABSTRACT OF THE DISCLOSURE

Apparatus for molding and curing rubber articles such as boots having a plurality of stations about a circular turntable provided with equally spaced apertures through which molds are accessible by platens and the like. The molds are moved to appropriate stations into position for effecting on each mold the sequential indexed operations of loading, injecting, curing (continued over several stations) and removing the finished articles therefrom. Each station is provided with non-rotatable platens applied to the molds through the apertures in appropriate stations, injection heads, etc., for performing their respective functions in the process.

---

This invention relates to injection molding apparatus.

When it is required to mold and vulcanize articles in a series of molds they are mounted on a turntable which is moved step-by-step to carry molds successively to each of a plurality of stations. It is necessary to heat and to apply molding pressure to the molds on the turntable to vulcanize the articles and other services, for example, pneumatic services for the removal of an article from a mold may be required. Since the table is subject to step-by-step movement it is known to provide electrical services through slip rings and bushes and steam, hydraulic and pneumatic pressure, services through rotary seals.

It is an object of the present invention to provide an apparatus of more simplified form.

According to the invention apparatus for molding and curing rubber articles or for molding plastic articles comprises a conveyor having a plurality of apertures adjacent to which molds may be located, means for indexing the conveyor to locate the apertures successively in a plurality of stations of the apparatus, a pair of relatively movable platens disposed in at least one of the said stations one on each side of the conveyor in alignment with an aperture located in said station, means for heating said platens, actuating means for relatively moving the platens towards and away from each other when an aperture is located in said station said actuating means being operable so as to relatively move the platens into clamping contact with a mold.

Preferably a pair of heated platens and associated actuating means are provided in two or more successive stations. Preferably also a rubber or plastic injection machine is located in one of the stations of the apparatus, the injection head of said machine being movable with respect to the conveyor so as to contact a feed hole in a mold located in the station.

The invention also includes a rubber or plastic article in the manufacture of which apparatus as defined above is used.

Figure 2:
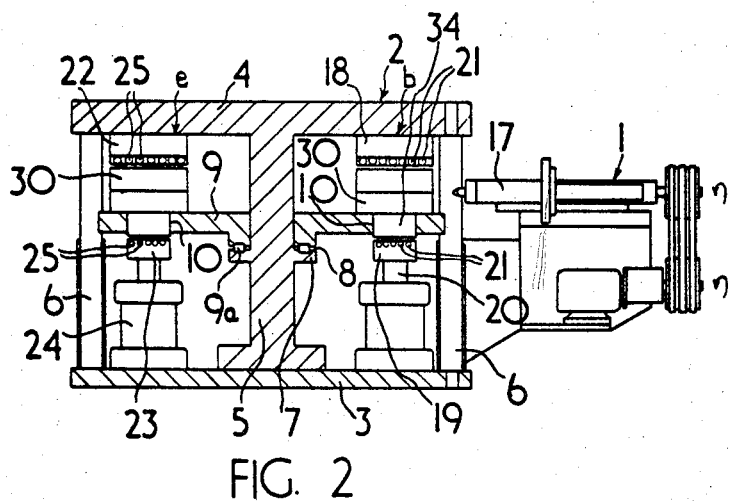
Figure 1:
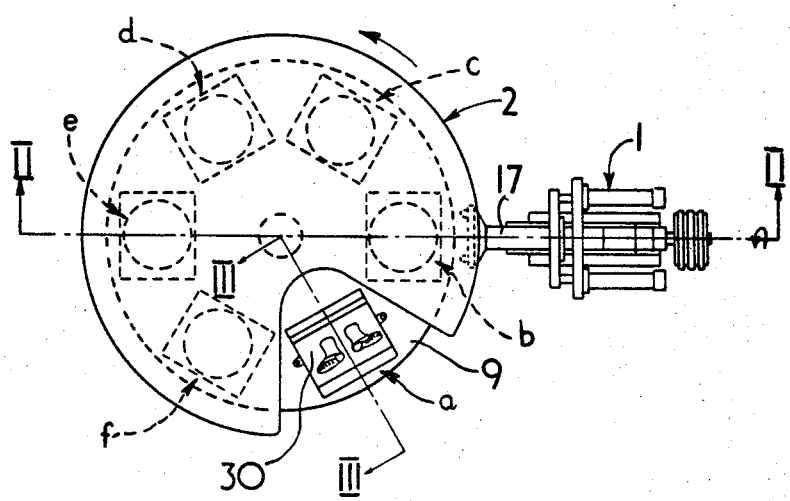
Figure 3:
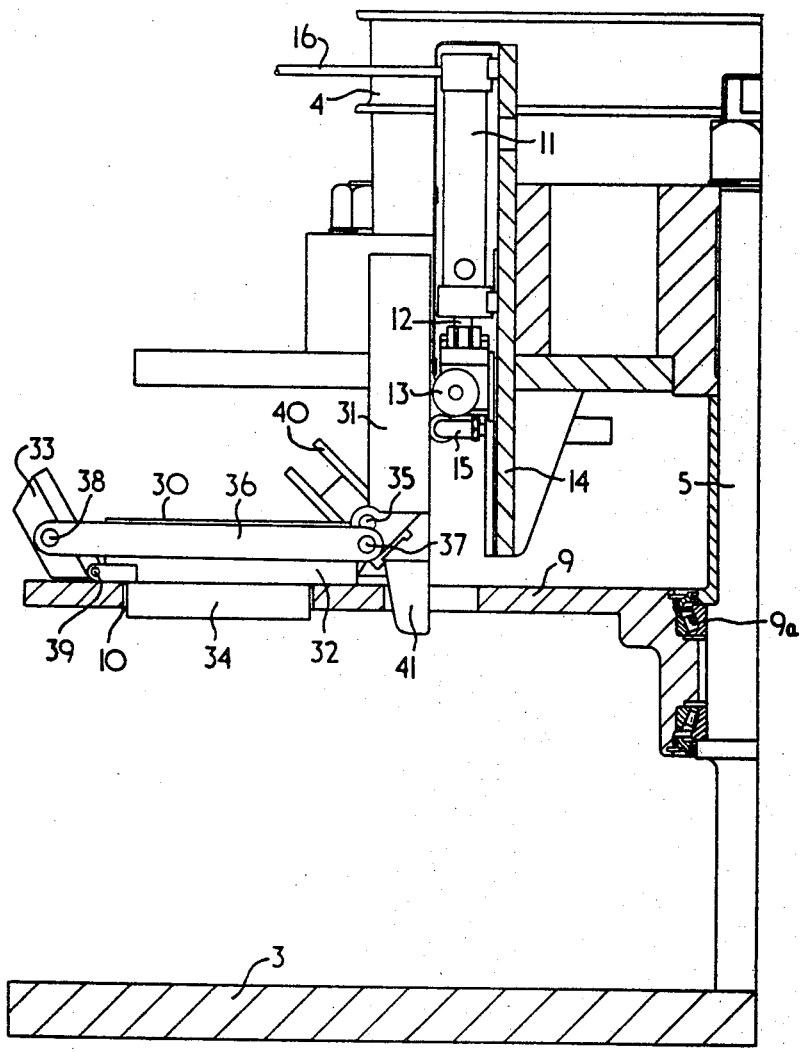

An embodiment of the invention will now be described by way of example with reference to the accompanying drawings in which:

FIGURE 1 is a diagrammatic top plan view of apparatus according to the invention, FIGURE 2 is a cross-sectional view on line II—II of FIGURE 1, also diagrammatic in form, FIGURE 3 is a detailed cross-sectional view on line III—III of FIGURE 1.

The apparatus shown in the drawings is an injection molding and curing machine for the production of small size rubber boots comprising an injection machine 1 and a boot mold carrying and curing device 2.

The device 2 has a circular bottom bearing frame 3 and a top frame 4 interconnected by a central column 5 and four peripheral columns 6, two of which are shown in FIGURE 2. The columns 5 and 6 are fixedly secured at their ends to frames 3 and 4 to prevent relative movement of the frames. The central column 5 has a flange 7 extending radially outwardly from approximately the mid-point of the column. The flange has a load bearing surface on its upper surface 8.

A turntable 9 comprises a central aperture and six further apertures 10 equally spaced-apart around and adjacent the periphery of the turntable. The turntable is mounted on the column with the column passing through the central aperture and the lower surface of the turntable in contact with bearing means 9a running on the upper surface 8 of the flange 7. The turntable is thus rotatably mounted on the column and is rotatable with respect to the column 5 and the top and bottom frames 3 and 4.

Six molds 30 are provided one for location at each of the apertures 10. Each mold as is best seen in FIGURE 3, comprises an upper hinged mold part 31, a lower hinged mold part 32, and a front-hinged mold part 33 for sole molding. The lower hinged mold part is provided on its base with a spigot 34 for location within an aperture 10. The upper mold part is hinged to the lower mold part at the hinge 35 and is swingable through 90° about the hinge from a position in contact with the lower mold part to a vertical position shown in FIGURE 3. A link 36 is pivotally connected to the upper and front mold parts respectively at 37 and 38 and the front mold part is hinged to the lower mold part at 39, the link operating so that when the upper mold part is swung through 90° the link is actuated to move the front mold part away from the lower mold part. A pair of lasts upon which boots can be manufactured is mounted on an internally pivoted member 40. Clearance is provided between the member 40 and the upper mold part so that during opening of the upper mold part through the first 45° of movement no movement of the lasts occurs, but during the last 45° of movement of the upper mold part the upper part engages the member 40 and raises the lasts clear of boot molding cavities in the lower mold part and into a position as shown in FIGURE 3 in which they lie at 45° to the upper and lower mold parts. The upper mold part has a tongue 41 extending beyond the hinge 35 for engagement by a mold opening mechanism as will be described. A pair of feed holes (not shown) are provided in the front hinged mold part, one hole leading into each boot molding cavity, for supplying rubber to form each boot.

The device has six stations, shown in FIGURE 1 at a, b, c, d, e, and f, and indexing means are provided, but not shown on the drawings, for moving the turntable in a stepwise manner to move each of the apertures 10 successively into the stations.

The stations will now be described.

Station a is a loading and unloading station and is shown in detail in FIGURE 3. A pneumatically-operated double acting piston and cylinder 11 are mounted above the turntable 9 and secured to the column 5 and top frame 4. The end of the piston rod 12 is constrained to move vertically on guide member 14 attached to column 5. A roller 13 is rotatably mounted on the end of the piston rod for engagement with the tongue 41 on the upper mold part 31 on downward movement of the piston to raise the upper mold part and bring the lasts clear of the lower mold part. A pair of spring-loaded plungers 15 is engaged by the upper mold part during opening thereof and on upward movement of the piston and roller the plungers assist in closing of the mold. Pressurised air is supplied to the piston and cylinder through pipe 16 which is connected directly to a source of pressurised air remote from the apparatus.

Rubber is injected into the molds at station b. The screw-type injection machine 1 is located adjacent to the station and is provided with an injection head 17 which is movable towards and away from a mold located in the station b. A pair of platens are located one on either side of the turntable in alignment with an aperture 10 located in the station when the turntable is stationary. The upper platen 18 is fixedly secured to the top frame 4. The lower platen 19 is mounted on the end of a fluid operated ram 20 and is vertically movable on operation of the ram. The lower platen has a cross-sectional shape identical with the cross-sectional shape of the spigot 34 on the mold so that on vertical movement of the ram the lower platen 19 engages the spigot and passes through the aperture to move the mold into clamping engagement with the upper platen 18. The lower surface of the upper platen is so positioned that, when the platens are in clamping engagement with the mold, the feed holes in the front hinged mold part 33 are in alignment with supply holes in the injection head 17.

A plurality of electrical cartridge heaters 21 are located in the lower part of the upper platen and the upper part of the lower platen. The heaters are connected directly to an electrical power source remote from the apparatus.

Stations c, d, e, and f are cure stations and are all substantially identical. Therefore only station e, shown in FIGURE 2, will be described. An upper platen 22 is secured to the upper frame 4 and a lower platen 23 is secured to the free end of a fluid-operated ram 24, as in the injection station b. In a similar manner the lower platen has a shape such that it will contact a spigot 34 on a mold and pass through the apertures 10. Electrical cartridge heaters 25 are installed in the platens and connected directly by cable to an electrical power supply. The platen 23 is vertically movable on the ram to contact the mold and move the mold into clamping engagement with both platens to heat the mold and vulcanize the rubber boots.

The operation of the apparatus just described will now be outlined.

Molds 30 are laid one after another onto the turntable 9 in alignment with the apertures 10 in station a as the turntable is indexed to locate the apertures successively in station a. When molds are located in all six apertures the apparatus is ready for use. In station a the mold is opened by operation of the piston and cylinder 11 to move the roller 13 downwardly into engagement with the tongue 41 provided on the upper mold part 31, the lasts being raised to a position inclined at 45° to the mold surfaces and prefabricated fabric boot liners are stretched into position over them.

The apparatus is actuated so that the piston and cylinder roller moves upwardly clear of the mold tongue so that the mold closes initially under the influence of spring plungers 15 and then by its own weight; the turntable is then indexed to bring the mold to station b. In this station the ram 20 beneath the turntable is operated to move the lower platen 19 vertically upwardly to engage the spigot base 34 of the mold to carry the mold, which is not clamped to the turntable, into clamping contact with the upper platen 18. When the mold is securely clamped, the injection head 17 is moved radially across the turntable towards the mold to engage with the mold feed holes to feed rubber material until the mold is filled, the rubber flowing round the fabric boot liners secured to the lasts and so forming two molded boots. Since the platens are heated vulcanization of the rubber commences in this station.

The mold is then moved on to stations c, d, e and f in which the boots are successively further vulcanized by means of the electrically-heated platens movable one after another, in each station successively, to clamp the mold between upper and lower platens as for example platens 22 and 23 in station e. Finally the mold is moved into station a again, in which station it is opened by vertically downward movement of the piston-operated roller 13 to engage the tongue 41, and the molded and vulcanizing boots removed from the lasts.

It will be appreciated that, although the operation of the machine has been described in conjunction with one mold successively moved into each separate station, at all the stations operations are carried out simultaneously on different molds so that a molded and vulcanized pair of boots is fed into and removed from the first position at each indexing of the turntable and new fabric liners provided to enable the process to be continuously operated.

It is an advantage if the machine described that the turntable does not require to be fed with electrical and/or hydraulic and/or pneumatic and/or steam services these being provided by direct, non-rotatable, connections to the stations. It is a simple machine design which is efficient in operation and is unaffected by the fact that heat and molding pressure are removed from the molds when, and during the elapse of time as, they are moved into each successive station.

In a modification of the apparatus the platens are heated by steam. Steam is led by feed pipes directly from a supply line to a steam chamber or steam channels within the platens. Since the platens do not rotate relative to the supply line it is not necessary to provide rotary seals in the feed pipes.

In a further modification of the apparatus the injection machine is located vertically above the mold in station b. The injection head is then fixed with respect to the injection machine and may replace or form part of the upper platen in station b and feed holes are provided in the upper hinged mold part. In operation of the modified apparatus the ram 20 is operated to move the mold into clamping engagement with the injection head, rubber or plastic is injected into the mold cavities, the ram is lowered to locate the mold on the turntable and the turntable indexed to locate the mold in station c.

Having now described our invention, what we claim is:

1. Apparatus for molding and curing rubber articles or for molding plastic articles comprising a conveyor having a plurality of apertures adjacent to which molds may be located, means for indexing the conveyor to move the apertures successively into and out of a plurality of stations of the apparatus, a pair of relatively movable platens disposed in at least one of the said stations one on each side of the conveyor in alignment with an aperture when located in said station, means for heating said platens, actuating means for relatively moving the platens towards and away from each other when an aperture is located in said station, said actuating means being operable so as to relatively move the platens into clamping contact with a mold.

2. Apparatus according to claim 1 wherein one pair of said heated platens and actuating means for relatively moving the platens are provided in each of a plurality of successive stations.

3. Apparatus according to claim 1 wherein the platen adjacent to the mold carrying surface of the conveyor is fixed relative to said surface and the actuating means are operable to move the platen remote from said surface towards the first of said platens.

4. Apparatus according to claim 1 wherein the conveyor is a turntable and the plurality of apertures are equally spaced about the turntable.

5. Apparatus according to claim 1 wherein the means for heating the platens are electrical means.

6. Apparatus according to claim 1 wherein the actuating means comprises a fluid-pressure-operated piston and cylinder mechanism.

7. Apparatus according to claim 1 wherein an injection machine is located in one of the stations of the apparatus, the head of said machine and a mold located in the station being relatively movable.

8. Apparatus according to claim 7 wherein there is provided, in the station prior to the station of claim 7 in the sense of conveyor movement, means for opening a mold located in said prior station.

References Cited

UNITED STATES PATENTS

| | | | |
|---|---|---|---|
| 3,091,810 | 6/1963 | Turner | 18—20 X |
| 3,117,345 | 1/1964 | Campbell et al. | 18—17 X |
| 3,233,285 | 2/1966 | Ludwig | 18—4 |
| 3,266,086 | 8/1966 | Markevitch | 18—30 X |
| 3,315,315 | 4/1967 | Triulzi | 18—20 X |

WILBUR L. McBAY, *Primary Examiner.*